United States Patent [19]

Iijima

[11] Patent Number: 4,988,855
[45] Date of Patent: Jan. 29, 1991

[54] PORTABLE ELECTRONIC APPARATUS

[75] Inventor: Yasuo Iijima, Yokohama, Japan

[73] Assignee: Kabushiki Kaisha Toshiba, Kawasaki, Japan

[21] Appl. No.: 397,194

[22] Filed: Aug. 23, 1989

[30] Foreign Application Priority Data

Aug. 26, 1988 [JP] Japan ................... 63-211834

[51] Int. Cl.⁵ .............................. G06K 19/06
[52] U.S. Cl. ................... 235/492; 235/487; 235/380
[58] Field of Search ............... 235/487, 380, 492

[56] References Cited

U.S. PATENT DOCUMENTS 4,734,568  3/1988  Watanabe ................... 235/487

Primary Examiner—Harold I. Pitts
Attorney, Agent, or Firm—Cushman, Darby & Cushman

[57] ABSTRACT

A plurality of key data are stored in an internal memory. These key data are collated with a set of second key data selectively input from an external device. Collation results are stored in units of key data. Upon an access to an area in the memory, an access is enabled when one of the stored collation results is affirmative or when all the collation results are affirmative. A plurality of access enable/disable judgement data are stored in correspondence with the areas, and a corresponding one of the access enable/disable judgement data is selected in accordance with externally input instruction data. An access enable/disable judgement for the area is made in accordance with the selected access enable/disable judgement data on the basis of the collation result.

5 Claims, 10 Drawing Sheets

FIG. 4

| | | |
|---|---|---|
| 21 | 22₁ DFN=XXX | 22₂ DFN=YYY |
| KID01 KEYDATA 1 10000000 | KID04 KEYDATA X4 00010000 | KID04 KEYDATA Y4 00010000 |
| KID02 KEYDATA 2 01000000 | KID05 KEYDATA X5 00001000 | KID05 KEYDATA Y5 00001000 |
| KID03 KEYDATA 3 00100000 | KID06 KEYDATA X6 00000100 | KID06 KEYDATA Y6 00000100 |
| AIDgg AREA G 10000000 A / 10000000 A | AIDaa AREA A 10000000 A / 10010000 A | AIDdd AREA D 10000000 A / 10001000 A |
| AIDhh AREA H 10000000 A / 01000000 A | AIDbb AREA B 10000000 A / 00000000 O | AIDee AREA E 10000000 A / 00010000 O |
| | AIDcc AREA C 00000000 O / 00001100 O | AIDff AREA F 10000000 A / 00001000 O |

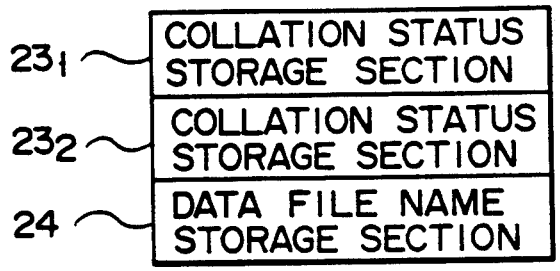
FIG. 5
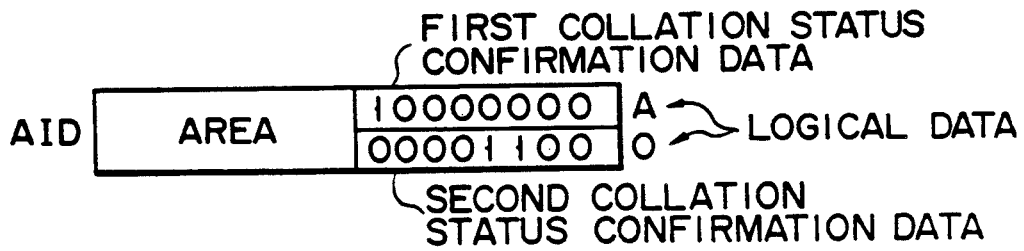
FIG. 6
FIG. 7
FIG. 8

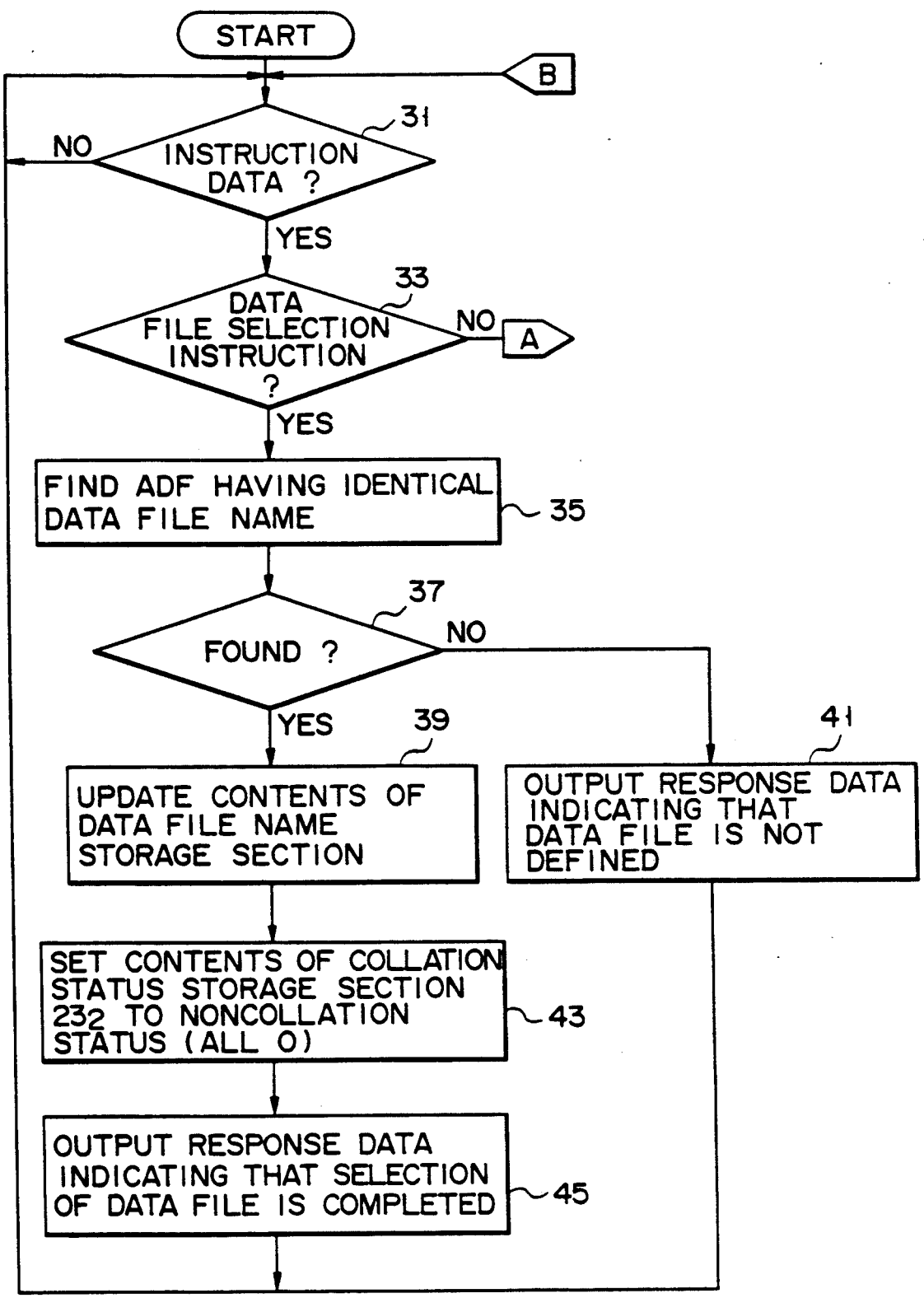
F I G. 9A

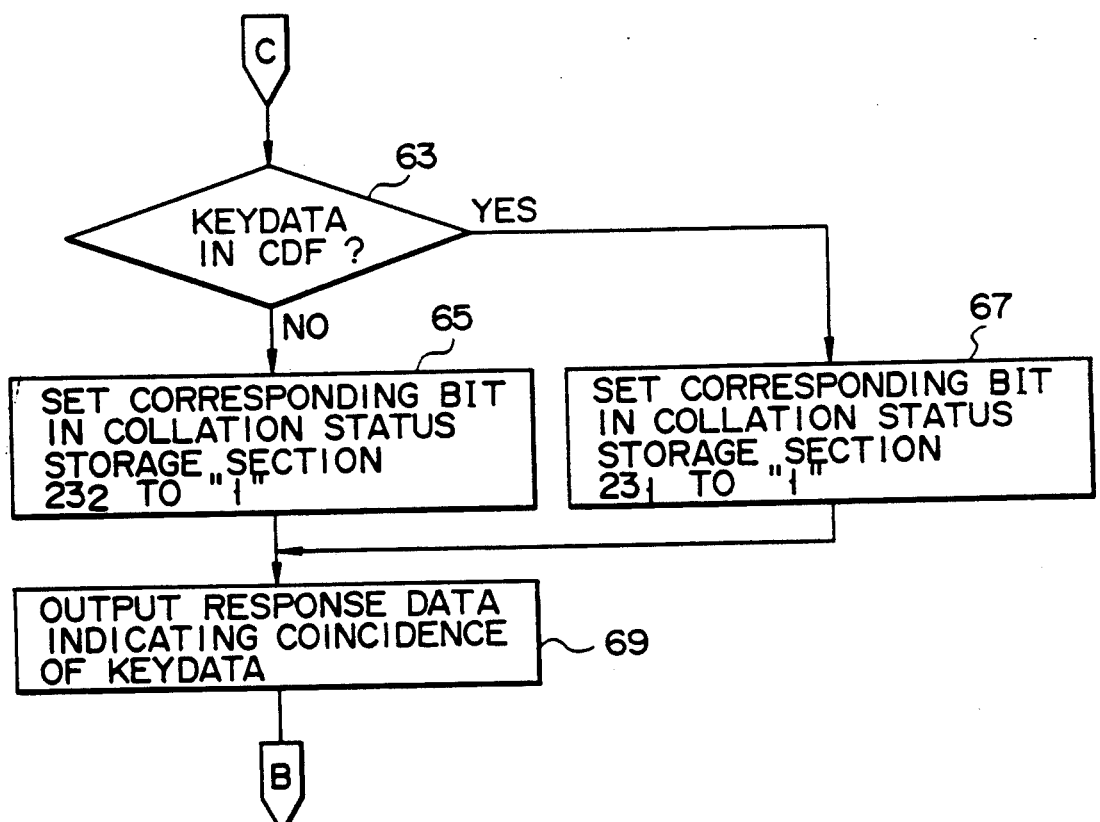
FIG. 9C
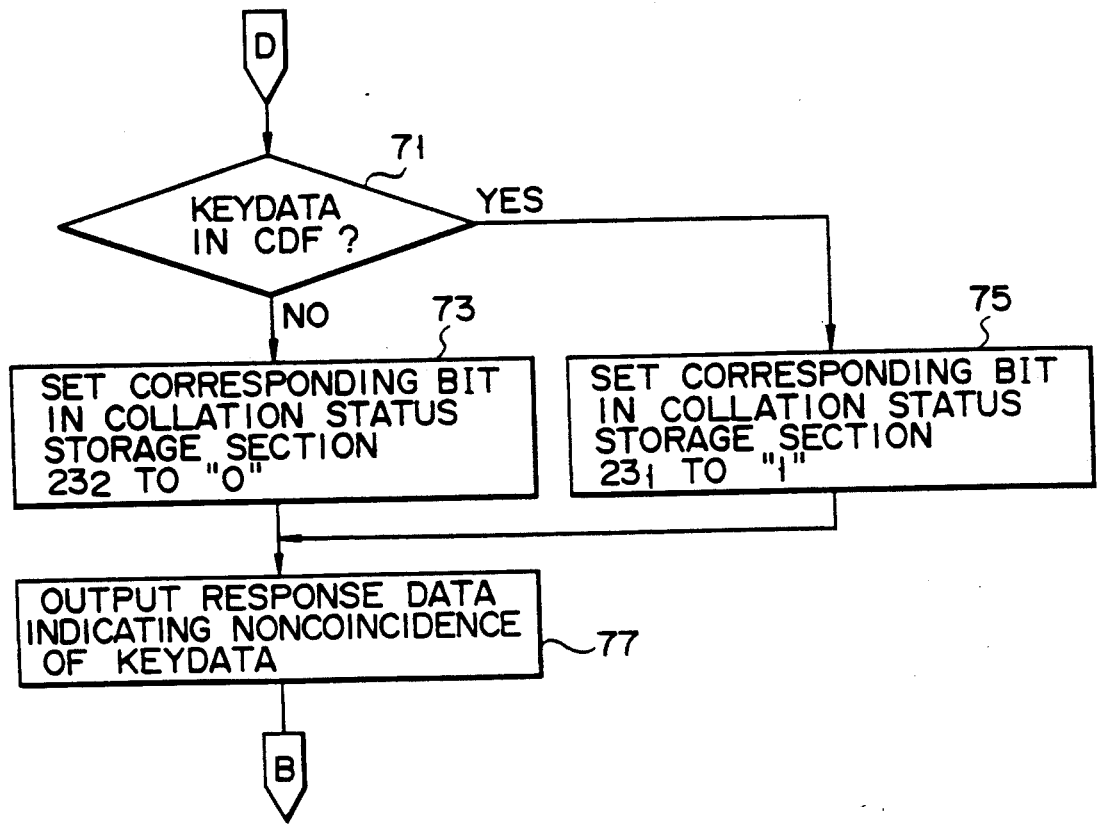

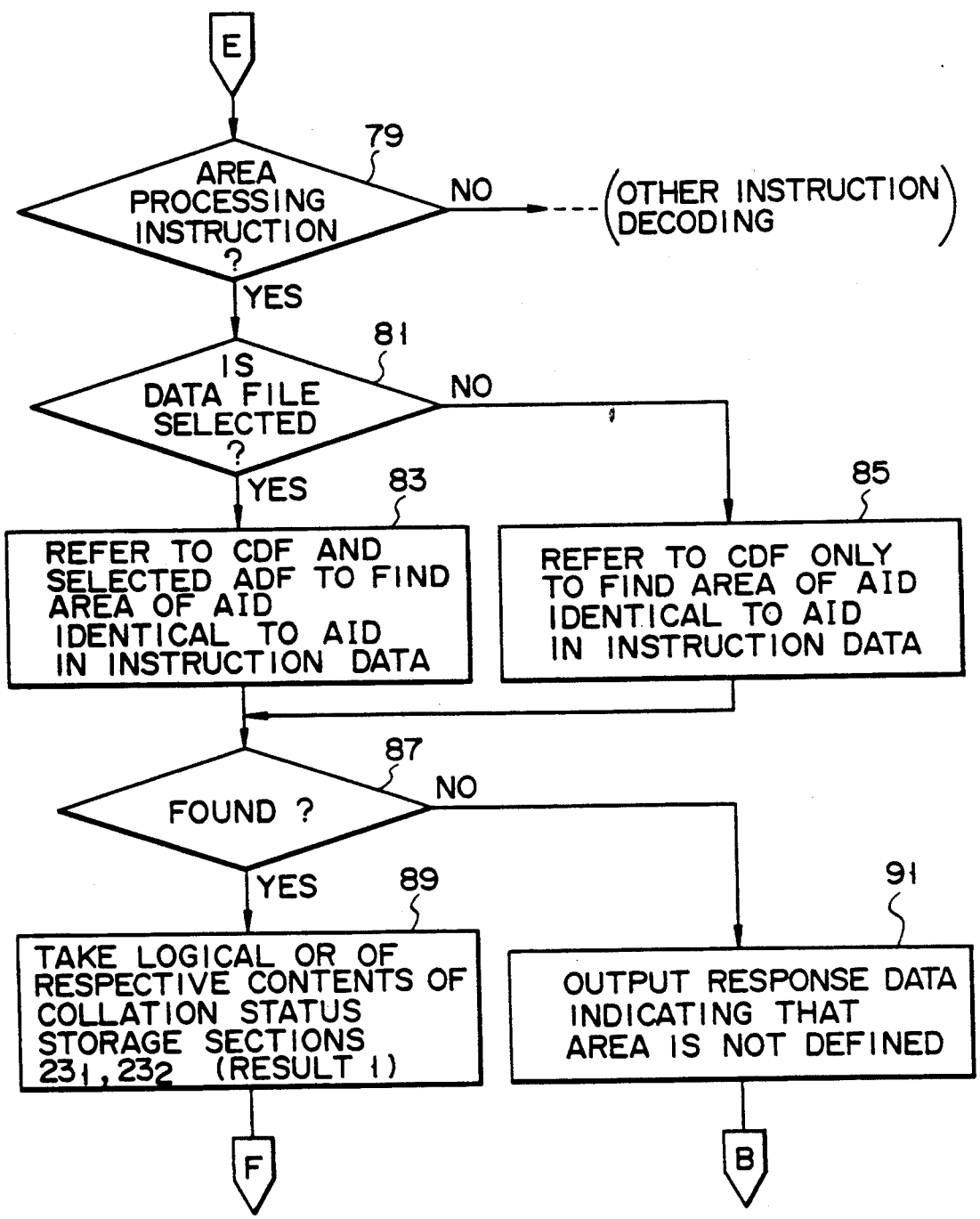
F I G. 9D

PORTABLE ELECTRONIC APPARATUS

BACKGROUND OF THE INVENTION

1. Field of the Invention

The present invention relates to a portable electronic apparatus, known as an Integrated Circuit Card (IC Card), which incorporates an IC chip having, e.g., a nonvolatile memory and a control element such as a CPU and, more particularly, to a portable electronic apparatus in which an access control method for an area of the memory is improved.

2. Description of the Related Art

A so-called IC card which incorporates an IC chip having, e.g., a nonvolatile memory and a control element such as a CPU has been developed as a portable storage medium. An IC card of this type stores an identification number as key data in its internal memory. When an identification number is externally input, it is collated with the registered identification number stored in the memory, and subsequent memory access is enabled or disabled in accordance with the collation result.

A conventional IC card is disclosed in Japanese Patent Disclosure (Kokai) No. 60-160491, Tamada et al., Aug. 22, 1985. (U.S. patent application Ser. No. 699,099).

As a method of determining whether or not an access to an area is enabled, a plurality of identification numbers are stored in a memory, and identification data indicating an identification number to be collated when a corresponding area is to be accessed is stored in correspondence with areas. Thus, the collation result of the identification numbers is compared with the identification data for each access to determine whether or not an access is enabled.

However, if the identification data is commonly used for all the access instruction data, the access conditions for all the instruction data become the same, an access condition to an area cannot be finely set, and hence, an IC card system cannot be flexibly used.

SUMMARY OF THE INVENTION

It is an object of the present invention to provide a portable electronic apparatus which can arbitrarily set a combination of key data necessary for an access to an area in units of areas, and which can set particularly an AND or OR logic together with the combination, so that an access condition for each area can be finely set, and flexibility in use of a system can be obtained.

It is another object of the present invention to provide a portable electronic apparatus which can vary an access condition for each instruction data used for accessing each area, and which can arbitrarily set a correspondence between instruction data and an access condition.

It is still another object of the present invention to provide a portable electronic apparatus which can set a specific access condition, e.g., an access disable condition and a free access condition in units of instruction data used for accessing each area, and which allows fine access control.

It is still another object of the present invention to provide a portable electronic apparatus which can set one of an access control, access disable, and free access conditions based on combination of key data necessary for an access and a combination logic as an access condition for each area with a small data volume.

According to the present invention, a plurality of key data are stored in an internal memory, and are collated with a set of second key data selectively input from an external device. The collation results are stored in units of key data. When a given area is accessed, an access is enabled if one of the stored collation results is affirmative or if all the stored collation results are affirmative.

Thus, a combination of key data necessary for an access to an area can be arbitrarily set in units of areas, and an AND or OR logic can be set together with the combination. Therefore, an access condition for each area can be finely set, thus obtaining flexibility in system configuration.

According to a second aspect of the present invention, a plurality of key data are stored in an internal memory, and are collated with a second set of key data selectively input from an external device. A plurality of access enable/disable judgement data are stored in correspondence with areas. Corresponding access enable/disable judgement data are selected in accordance with externally input instruction data, and an access enable/disable judgement for each area is performed in accordance with the selected access enable/disable judgement data on the basis of the collation result.

BRIEF DESCRIPTION OF THE DRAWINGS

FIG. 4 shows a file structure of a data memory shown in FIG. 3;

FIG. 5 is a view for explaining identification data for key data;

FIG. 6 is a view for explaining a collation status storage section and a data file name storage section;

FIG. 7 is a view for explaining identification data for an area;

FIG. 8 is a view for explaining data table storing selection data for selecting collation status confirmation data in correspondence with various instruction codes;

FIGS. 9A through 9E are flow charts for explaining processing operations;

DETAILED DESCRIPTION OF THE PREFERRED EMBODIMENT

An embodiment of the present invention will be described below with reference to the accompanying drawings.

Figure 1:
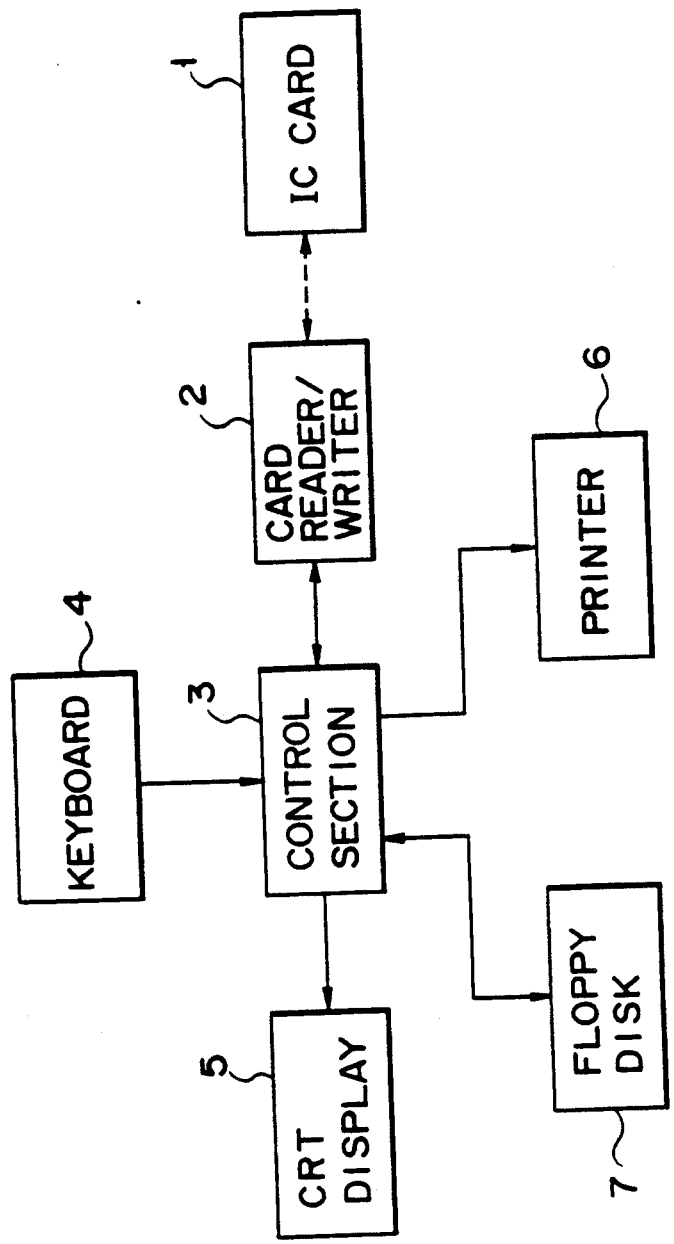
FIG. 1 is a block diagram showing an arrangement of a portable electronic apparatus of the present invention and a handling terminal device.

FIG. 1 shows an IC card as a portable electronic apparatus according to the present invention, and a terminal device handling the IC card. An IC card 1 can be connected to a control section 3 comprising, e.g., a CPU through a card reader/writer 2. The control section 3 is connected to a keyboard 4, a CRT display 5, a printer 6, and a floppy disk device 7. The IC card is held by a user, and is used for referring to key data (identification number) known by the user upon purchasing of commodity and storing necessary data.

Figure 2:
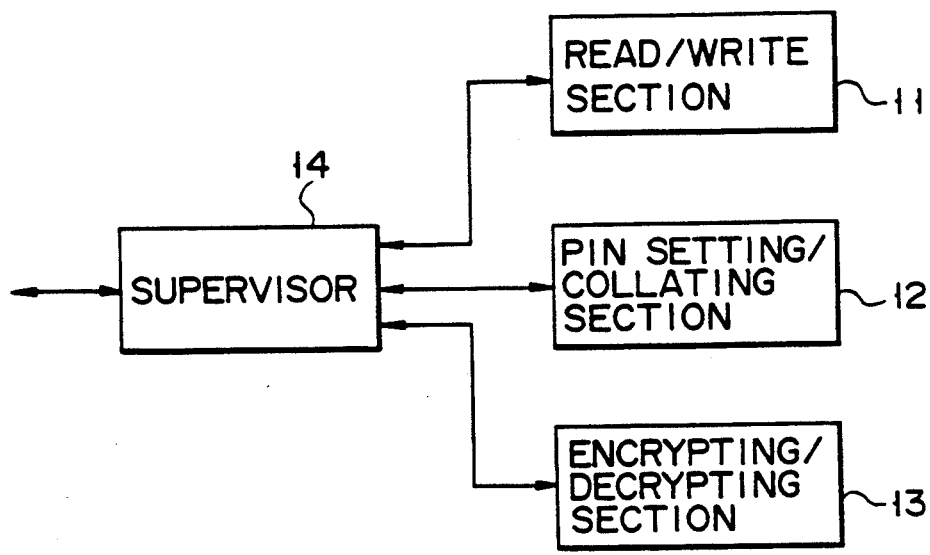
FIG. 2 is a block diagram showing functions of an IC card shown in FIG. 1.

FIG. 2 shows function blocks of the IC card. The IC card is constituted by sections for executing basic functions, i.e., a read/write section 11, a PIN setting/collating section 12, and an encrypting/decrypting section 13, and a supervisor 14 for managing these basic functions.

The read/write section 11 has a function of reading, writing, or deleting data with respect to a data memory 16 or the like.

The PIN setting/collating section 12 has a function of performing storage and readout inhibition processing operations of an identification number set by the user, and a function of collating the identification number after the identification number is set to permit the subsequent processing.

The encrypting/decrypting section 13 has a function of encrypting data in order to prevent disclosure or forgery of communication data when data is transmitted from the control section 3 to another terminal device through a communication line, and of decrypting the encrypted data. For example, the section 13 has a function of performing data processing in accordance with an encryption algorithm having a sufficient encryption strength, such as the DES (Data Encryption Standard).

The supervisor 14 has a function of decoding a function code input from the card reader/writer 2 or a function code added with data, and selecting and executing a necessary one of the basic functions.

Figure 3:
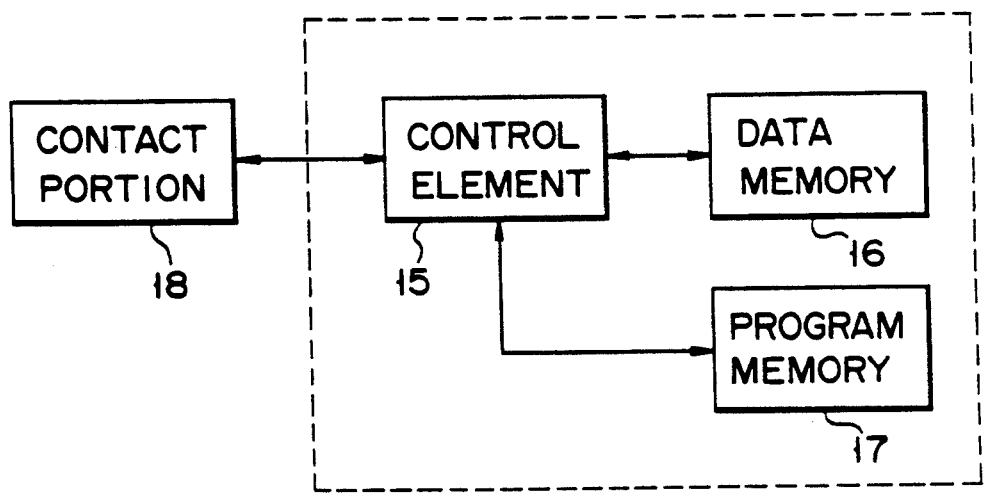
FIG. 3 is a block diagram showing an arrangement of the IC card shown in FIG. 1.

In order to realize these functions, the IC card 1 comprises a control element (control section) 15 such as a CPU, a data memory (memory section) 16, a program memory 17, and a contact portion 18 for obtaining an electrical contact with the card reader/writer 2, as shown in FIG. 3. Of these components, the control element 15, the data memory 16, and the program memory 17 are constituted by a single IC chip (or a plurality of IC chips), and are embedded in an IC card main body.

The program memory 17 comprises, e.g., a mask ROM, and stores a control program and the like of the control element 15 having subroutines for realizing the abovementioned basic functions.

As shown in FIG. 4, data memory 16 comprises, e.g., a programmable nonvolatile memory such as an EEPROM, used for storing various data.

The data memory 16 is constituted by a common data file (first region) 21 accessed in all the applications and a plurality of application data files (second regions) $22_1$ and $22_2$ accessed in units of applications, as shown in FIG. 4. Each of the data files 21, $22_1$, and $22_2$ stores a plurality of key data (identification number), and includes a plurality of areas.

A data file name (DFN) is given to each of the application data files $22_1$ and $22_2$. When a data file name is designated using key data file selection instruction data (to be described later), an application data file to be accessed is recognized.

Identification data (KID) for designating key data is given to each key data, as shown in FIG. 5. When identification data is designated using key data collation instruction data (to be described later), key data to be subjected to collation processing is recognized.

In FIG. 4, identification data KID01, KID02, and KID03 are given to key data 1, 2, and 3 belonging to the common data file 21. Identification data KID04, KID05, and KID06 are given to key data X4, X5, and X6 belonging to the application data file $22_1$. Identification data KID04, KID05, and KID06 are also given to key data Y4, Y5, and Y6 belonging to the application data file $22_2$. Collation status designation data is given to each key data, as shown in FIG. 5. The collation status designation data is used to identify whether key data necessary for subsequent access has already been collated.

Data indicating whether key data has already been collated is stored in collation status storage sections $23_1$ and $23_2$ shown in FIG. 6. The collation status storage sections $23_1$ and $23_2$ are allocated in a RAM incorporated in, e.g., the control element 15. Key data belonging to the common data file 21 is stored in the collation status storage section $23_1$, and key data belonging to the application data files $22_1$ and $22_2$ is stored in the collation status storage section $23_2$.

As shown in FIG. 6, a data file name storage section 24 is allocated together with the collation status storage sections $23_1$ and $23_2$. The data file name storage section 24 stores a data file name of the data file selected as an object to be accessed by data file selection instruction data (to be described later).

As shown in FIG. 7, identification data (AID) for designating an area is given to each area. Therefore, when the identification data is designated using area processing instruction data (to be described later), an area serving as an object of area processing can be recognized.

In FIG. 4, identification data AIDgg and AIDhh are given to areas G and H belonging to the common data file 21. Identification data AIDaa, AIDbb, and AIDcc are given to areas A, B, and C belonging to the application data file $22_1$. Identification data AIDdd, AIDee, and AIDff are given to areas D, E, and F belonging to the application data file $22_2$.

Each area is added with first and second collation status confirmation data, as shown in FIG. 7. Logical data (A or O) are given to these first and second collation statuses confirmation data. The first and second collation status confirmation data request collation statuses of key data necessary in an area access. The logical data indicates whether a combination of the collation status confirmation data is an AND or OR logic. In the case of the AND logic, the logical data is set to be "A", and in the case of the OR logic, it is set to be "O".

FIG. 8 shows a data table for selecting the two collation status confirmation data assigned to each area in units of instruction codes. The data table stores selection data for selecting the collation status confirmation information in correspondence with various instruction codes, and this data table is allocated in, e.g., the data memory 16.

The embodiment of the portable electronic apparatus according to the present invention will be described below with reference to the flow charts shown in FIGS. 9A through 9F. On the flow charts, the common data file 21 is abbreviated as CDF, and the application data file $22_1$ or $22_2$ is abbreviated as ADF.

Data file selection processing will be described below with reference to the flow chart shown in FIG. 9A. In a steady state, the control waits for instruction data. If instruction data is input in step 31, the control element 15 checks in step 33 if the input instruction data is a data file selection instruction shown in FIG. 10. If NO in step 33, the flow advances to step 47, and the control element 15 executes another processing.

If YES in step 33, the control element 15 finds an application data file having identical data file name to that in this instruction data from the data memory 16 in step 35. If no such file is found in step 37, the control element 15 outputs response data indicating that the data file is not defined in step 41, and the flow returns to the instruction data standby state in step 31.

If YES in step 37, the control element 15 stores the data file name in this instruction data in the data file name storage section 24 of FIG. 6 in step 39, and sets the content of the collation status storage section $23_2$ in a non-collation status, i.e., sets all the bits to be "0" in step 43. The control element outputs response data indicating that the selection of the data file is completed, in step 45, and the flow then returns to the instruction data standby state in step 31.

When the IC card is started, the contents of the storage sections $23_1$ and $23_2$ in FIG. 6 are all "0"s. In this case, if data file selection instruction data having a data file name "xxx" is input, a value "xxx" is stored in the data file name storage section 24.

Figure 9B:
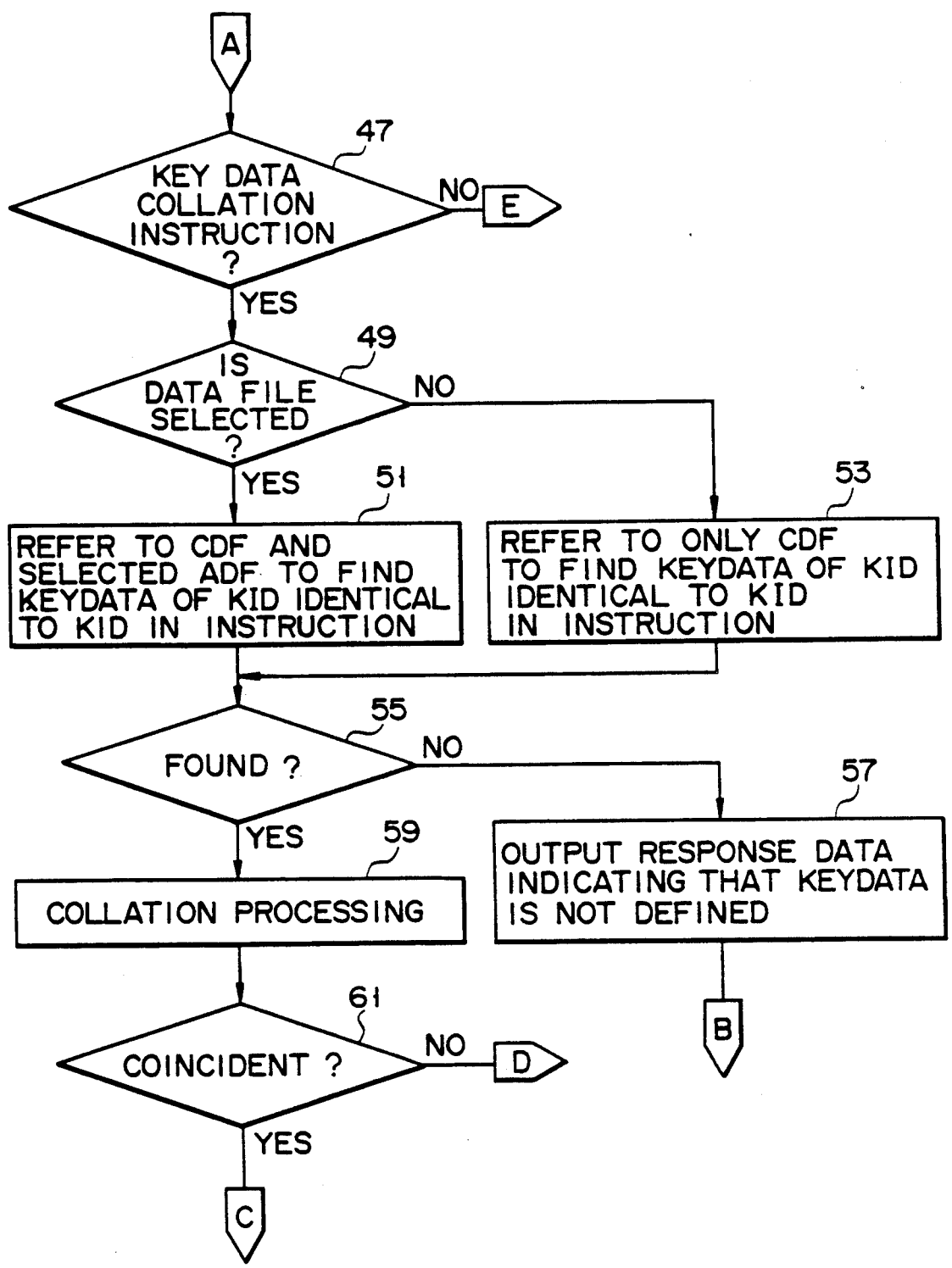
Figure 10:
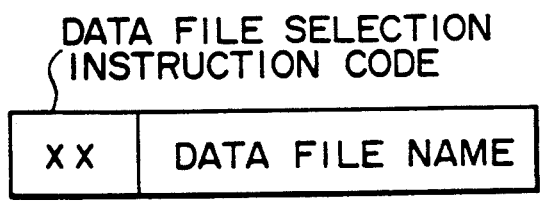
FIG. 10 shows a format of data file selection instruction data.
Figure 11:
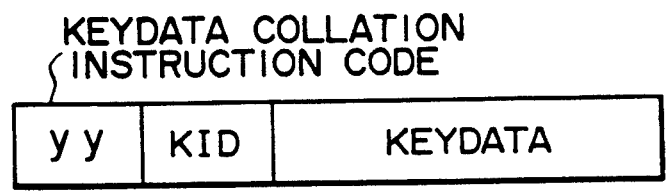
FIG. 11 shows a format of key data collation instruction data.

Key data collation processing will be described below with reference to the flow charts shown in FIGS. 9B and 9C. If it is determined in step 33 that the input instruction data is not the data file selection instruction data, the control element 15 checks in step 47 if the input instruction data is a key data collation instruction shown in FIG. 11. If NO in step 47, the flow advances to step 79, and the control element 15 executes another processing.

If YES in step 47, the control element 15 checks in step 49 if the content of the data file name storage section 24 is all "0"s (whether or not the data file is selected). If it is determined in step 49 that the content is all "0"s, this means that no data file is selected, and the control element 15 refers to the common data file in step 53 to find key data having identical identification data (KID) to that in the input instruction data in step 55. If it is determined in step 49 that the content is not all "0"s, this means that a data file is selected. Therefore, the control element 15 refers to the common data file 21 and the selected one of the application data files $22_1$ and $22_2$ in step 51 to find key data having identical identification data to that in the input instruction data in step 55. If NO in step 55, the control element 15 outputs response data indicating that the key data is not defined, in step 57, and the flow returns to the instruction data standby state in step 31.

If YES in step 55, the control element 15 collates the found key data and key data in the input instruction data in step 59.

As a result of collation in step 61, if a coincidence is found between the two key data, the control element 15 checks in step 63 if the key data belongs to the common data file 21 or the application data file $22_1$ or $22_2$. If it is determined in step 63 that the key data belongs to the common data file 21, the control element 15 refers to the collation status designation data given to the key data, and sets a bit of the collation status storage section $23_1$ corresponding to a bit "1" of the designation data to be "1" in step 67. If it is determined in step 63 that the key data belongs to the application data file, the control element 15 similarly sets a bit of the collation status storage section $23_2$ corresponding to a bit "1" of the designation data to be "1". In step 69, the control element 15 outputs response data indicating the coincidence of the key data, and the flow returns to the instruction data standby state.

As a result of collation in step 61, if a noncoincidence is found between the key data, the control element 15 similarly sets a corresponding bit of the collation status storage section $23_1$ or $23_2$ to "0" in step 65. In step 69, the control element 15 outputs response data indicating a noncoincidence of the key data, and the flow returns to the instruction data standby state.

For example, when key data 1 and key data Y5 and Y6 are collated after the application data file $22_2$ is selected by the data file selection instruction data the content of the collation status storage section $23_1$ is set to be "10000000", the content of the collation status storage section $23_2$ is set to be "00001100", and the content of the data file name storage area 24 is set to be "YYY". When the application data file $22_1$ is selected thereafter, the content of the collation status storage section $23_1$ is left unchanged, the content of the collation status storage section $23_2$ is set to be "00000000", and the content of the data file name storage section 24 is set to be "xxx".

Figure 9E:
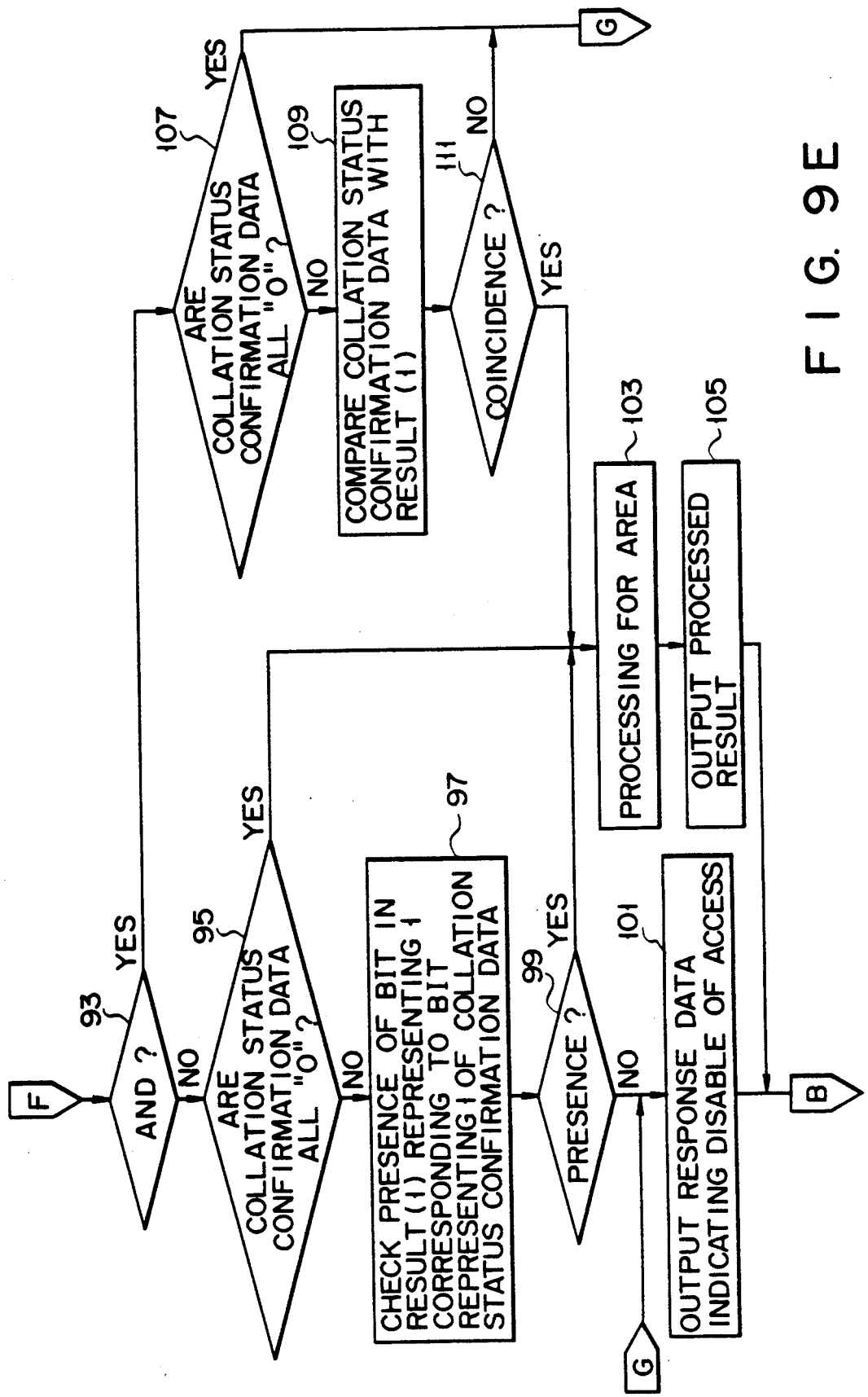
Figure 12A:
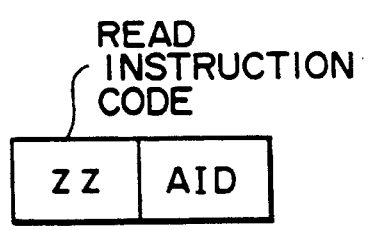
FIG. 12A shows a format of read instruction data to an area.
Figure 12C:
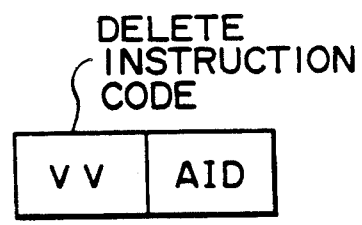
FIG. 12C shows a format of delete instruction data to an area.
Figure 12B:
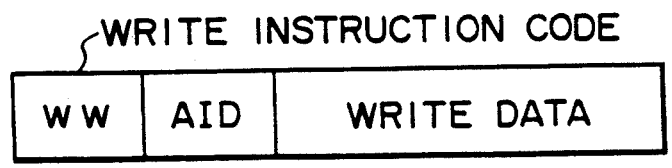
FIG. 12B shows a format of write instruction data to an area.

Next, area processing (data read, write, and delete processing in an area) will be described below with reference to the flow charts shown in FIGS. 9D and 9E. If it is determined in step 47 that the input instruction data is not the key data collation instruction data, the control element 15 checks in step 79 if the input instruction data is read instruction data shown in FIG. 12A, write instruction data shown in FIG. 12B, or delete instruction data shown in FIG. 12C. If NO in step 79, the control element 15 executes another processing.

If YES in step 79, the control element 15 checks in step 81 if the content of the data file name storage section 24 is all "0"s (whether or not the data file is selected). If it is determined in step 81 that the content is all "0"s, this means that no data file is selected, and the control element 15 refers to the common data file 21 and the selected one of the application data files $22_1$ and $22_2$ to find an area having identical identification data (AID) to that in the input instruction data in step 85.

If it is determined in step 81 that the content is not all "0"s, this means that a data file is selected. Therefore, the control element 15 refers to the common data file 21 and the selected one of the application data files $22_1$ and $22_2$ to find an area having identical identification data (AID) to that in the input instruction data in step 83. If no such area is found in step 87, the control element 15 outputs response data indicating that an area is not defined, in step 91, and the flow returns to the instruction data standby state.

If YES in step 87, the control element 15 takes a logical OR of the contents of the collation status storage sections $23_1$ and $23_2$ in step 89, and sets the OR result as "result 1".

The control element 15 searches for an identical instruction code to that in the input instruction data from the data table shown in FIG. 8 to select two collation status confirmation data assigned to each area. If the area processing instruction data is read instruction data, since its instruction code is "zz", the first collation status confirmation data is selected by corresponding selection data "1"; if it is write instruction data, since its instruction code is "ww", the second collation status confirmation data is selected by corresponding selection data "2"; and if it is delete instruction data, since its instruction code is "vv", the second collation status confirmation data is selected by corresponding selection data "2".

When the first or second collation status confirmation data is selected in this manner, the control element 15 refers to the selected collation status confirmation data in step 93 to check if the logical data added thereto is an AND logic. If NO in step 93 (if an OR logic is selected), the control element 15 checks in step 95 if the bits of the collation status confirmation data are all "0"s. If YES in step 95, the control element 15 does not confirm the collation status and executes processing for the area in step 103.

If it is determined in step 95 that any bit is "1", the control element 15 checks in step 97 if a bit in the result 1 corresponding to the bit "1" is set to be "1". As a result of step 97, if none of bits are "1", the control element 15 outputs response data indicating disable of access in step 101, and the flow returns to the instruction data standby state. As a result of step 97, if any bit is "1", the control element performs processing for the area in step 103.

If YES in step 93, the control element 15 similarly checks in step 107 if the content of the collation status confirmation data is all "0"s. If YES in step 107, the control element 15 determines that an access to the corresponding area is disabled, and outputs response data indicating disable of access in step 101. The flow then returns to the instruction data standby state.

If it is determined in step 107 that any bit is "1", the control element 15 compares this collation status confirmation data with the result 1. If it is determined in step 111 that a noncoincidence is found between these data, the control element 15 outputs response data indicating disable of access in step 101, and the flow returns to the instruction data standby state in step 31. If it is determined in step 111 that a coincidence is found between the two data, the control element 15 performs processing for the area in step 103. After the processing, the control element 15 outputs the processing result as response data in step 105, and the flow then returns to the instruction data standby state in step 31.

More specifically, in FIG. 4, for an area B, the logical data of the first collation status confirmation data added to the area B indicates an AND logic "A", and the first collation status confirmation data is "10000000". Therefore, a read access to the area B can be enabled after only the key data 1 is collated. The second collation status confirmation data is "00000000", and its logical data indicates an OR logic "O". Therefore, write and read accesses to the area B can be performed without collation of key data.

For an area C, the first collation status confirmation data is "00000000", and its logical data indicates an AND logic "A". Therefore, a read access to the area C is disabled. The second collation status confirmation data is "00001100", and its logical data indicates an OR logic "O". Therefore, after one of the key data X5 or X6 is collated, write and delete accesses to the area C are enabled.

After collation of the key data Y5 and Y6, when the application data file $22_1$ is selected to execute a write access to the area C, the collation statuses of the key data Y5 and Y6 are cleared upon selection of the data file, and the access to the area C is disabled.

The collation statuses of key data in the application data files $22_1$ and $22_2$ are effective for only an access to an area in an identical application data file.

The key data X4 of the application data file $22_1$ and the key data Y4 of the application data file $22_2$ are added with identical identification data (KID). When the identification data is designated, since one of these application data files serves as an object to be accessed, these key data will not be confused. However, identical identification data (KID) is not used between the common data file and the other application data files. Note that this also applies to the identification data (AID) given to an area.

In the identical application data file, since the identification data (AID) and identification data (KID) can be uniquely determined depending on the instruction data, they can employ an identical value.

The number of collation status confirmation data given to each area can be changed in correspondence with the numbers of instructions and processing operations for the area.

In this manner, a plurality of key data (identification numbers) are stored in the data memory, and are collated with input data. The collation results are stored in units of key data. When a given area of the data memory is accessed, an access to the area is enabled if one of the stored collation results is affirmative or if all the stored collation results are affirmative. Either of these conditions can be set in units of instruction data used for accessing each area of the data memory.

Thus, a combination of key data necessary for an access to an area can be arbitrarily set in units of areas of the data memory, and an AND or OR logic can be set together with the combination. The combination can be set in units of instruction data used for accessing each area of the data memory. Therefore, an access condition for each area of the data memory can be finely set, thus obtaining a flexible configuration of an IC card system.

A plurality of access enable/disable judgement data are stored in correspondence with areas of the data memory. Corresponding access enable/disable judgement data are selected in accordance with externally input instruction data, and an access enable/disable judgement for each area of the data memory is performed in accordance with the selected access enable/disable judgement data on the basis of the collation result of the key data.

More specifically, the plurality of access enable/disable judgement data are set in correspondence with areas of the data memory, and access enable/disable judgement data are selected in units of instruction data used for accessing each area, thus performing the access enable/disable judgement.

An access condition can be varied in units of instruction data used for accessing each area of the data memory, and data indicating a correspondence between the instruction data and the access condition is stored in the data memory. Therefore, the correspondence can be arbitrarily set upon manufacture of the IC card or the like.

The following determinations can be set in units of areas of the data memory; whether an access enable/disable judgement for each area of the data memory is performed on the basis of the collation result of key data; whether an access to each area of the data memory is enabled regardless of the collation result of key data; or whether an access to each area of the data memory is disabled regardless of the collation result of key data.

As an access condition for each area of the data memory, access disable and free access conditions are employed, and these access conditions can be set in units of instruction data used for accessing each area of the data memory.

Thus, the access conditions, i.e., the access disable and free access conditions can be set in units of instruction data used for accessing each area of the data memory. Therefore, fine access control of the IC card can be realized.

Combination data of the collation results of key data and identification data (logical data) for identifying that an access is enabled if all the collation results of key data indicated by the combination are affirmative or if one of these results is affirmative are stored in correspondence with the areas of the data memory. Identification data (logical data) for identifying whether an access enable/disable judgement is made for each area of the data memory in accordance with the combination data and the former identification data on the basis of the collation result of key data, or identifying data for identifying whether an access is enabled on the basis of the collation result of key data is stored in correspondence with the areas of the data memory. The following determinations are set in units of areas of the data memory: whether an access enable/disable judgement is made for each area of the data memory in accordance with the combination data and the identification data on the basis of the collation result of key data; whether an access to an area of the data memory is disabled on the basis of the combination data and the identification data regardless of the collation result of key data; or whether an access to each area of the data memory is enabled on the basis of the combination data and the identification data regardless of the collation result of key data.

Thus, the combination data of key data and identification data indicating that the combination is an AND or OR logic are set, so that an access disable or free access condition can be set. Therefore, one of the access control, access disable, and free access conditions based on the combination of the key data necessary for an access and a combined logic can be set as an access condition for each area of the data memory with a small data volume.

What is claimed is:

1. A portable electronic apparatus comprising:
   a memory divided into a plurality of areas;
   control means for controlling an access to said memory and selectively exchanging data with an external device;
   key data storage means for storing a plurality of key data;
   collation means for collating at least one of the plurality of key data with a plurality of second key data selectively input from the external device;
   collation result storage means for storing collation results of said collation means in units of the plurality of key data;
   first access control means for enabling access to an area of said memory when one of the collation results stored in said collation result storage means is affirmative; and
   second access control means for enabling an access to the area when all the collation results stored in said collation result storage means are affirmative.

2. An apparatus according to claim 1, wherein said memory is divided into a plurality of said areas, one of said first and second access control means being used with externally input instruction data, thereby accessing the corresponding area in said memory.

3. A portable electronic apparatus comprising:
   a memory divided into a plurality of areas;
   control means for controlling an access to said memory and selectively exchanging data with an external device;
   key data storage means for storing a plurality of key data;
   collation means for collating at least one of the plurality of key data with a plurality of second key data selectively input from the external device;
   access enable/disable judgement data storage means for storing a plurality of access enable/disable judgement data corresponding to the plurality of divided areas, respectively;
   selection means for selecting a corresponding one of the plurality of access enable/disable judgement data in accordance with externally input instruction data; and
   judgement means for performing an access enable/disable judgement for one of the plurality of areas in accordance with the access enable/disable judgement data selected by said selection means on the basis of the collation result of said collation means.

4. A portable electronic apparatus comprising:
   a memory divided into a plurality of areas;
   control means for controlling an access to said memory means and selectively exchanging data with an external device;
   key data storage means for storing a plurality of key data;
   collation means for collating at least one of the plurality of key data with a plurality of second key data selectively input from the external device;
   access enable/disable judgement means for performing an access enable/disable judgement for one of the plurality of areas on the basis of a collation result of said collation means;
   access enable means for enabling an access to the one of the plurality of areas regardless of the collation result of said collation means;
   access disable means for disabling an access to the area regardless of the collation result of said collation means; and
   setting means for setting one of said access enable/disable judgement means, said access enable means, and said access disable means to be used in units of the areas.

5. A portable electronic apparatus comprising:
   a memory divided into a plurality of areas;
   control means for controlling an access to said memory means and selectively exchanging data with an external device;
   key data storage means for storing a plurality of key data;
   collation means for collating at least one of the plurality of key data with a plurality of second key data selectively input from the external device;
   identification data storage means for storing, in correspondence with the areas, combination data of the collation results of the plurality of key data by said collation means, said identification data storage means also storing identification data for identifying that an access is enabled if all the collation results of the key data indicated by the combination data are affirmative or if one of the collation results is affirmative;
   access enable/disable judgement means for performing an access enable/disable judgement for one of the plurality of area in accordance with the combination data and the identification data on the basis of the collation result of said collation means;

access enable means for enabling an access to the area in accordance with the combination data and the identification data regardless of the collation result of said collation means;

access disable means for disabling an access to the area in accordance with the combination data and the identification data regardless of the collation result of said collation means; and setting means for setting one of said access enable/disable judgement means, said access enable means, and said access disable means to be used in units of the areas.

* * * * *